US006713624B1

(12) United States Patent
Doane, Jr. et al.

(10) Patent No.: US 6,713,624 B1
(45) Date of Patent: Mar. 30, 2004

(54) STARCH-BASED MODELING COMPOUND

(75) Inventors: Linwood E. Doane, Jr., Chepachet, RI (US); Lev Tsimberg, Pawtucket, RI (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 10/137,579

(22) Filed: May 2, 2002

(51) Int. Cl.[7] .................. C08B 31/00; C08B 35/00; C08B 33/00
(52) U.S. Cl. .................. 536/45; 536/123.1; 536/124
(58) Field of Search .................. 536/45, 123.1, 536/124

(56) References Cited

U.S. PATENT DOCUMENTS

| | | | |
|---|---|---|---|
| 3,167,440 A | 1/1965 | McVicker et al. | 106/150 |
| 4,172,054 A | * 10/1979 | Ogawa et al. | |
| 4,568,539 A | * 2/1986 | Ashton et al. | |
| 4,673,438 A | 6/1987 | Wittwer et al. | 106/126 |
| 4,690,829 A | 9/1987 | Usui | 426/661 |
| 5,128,461 A | 7/1992 | Best et al. | 536/111 |
| 5,320,669 A | 6/1994 | Lim et al. | 106/157 |
| 5,468,286 A | 11/1995 | Wai-Chiu et al. | 106/210 |
| 5,506,280 A | 4/1996 | Miller et al. | 523/218 |
| 5,578,119 A | 11/1996 | Short et al. | 106/287.35 |
| 5,916,949 A | 6/1999 | Shapero et al. | 524/487 |
| 5,925,380 A | 7/1999 | Roulier et al. | 424/489 |
| 6,007,830 A | 12/1999 | Roulier et al. | 424/401 |
| 6,030,673 A | 2/2000 | Andersen et al. | 428/36.4 |
| 6,231,970 B1 | 5/2001 | Andersen et al. | 428/332 |
| 6,359,057 B1 * | 3/2002 | Li | |

OTHER PUBLICATIONS

EP 134121 A1 (Mar. 13, 1985) (abstract sent).*
Hegenbart, "Understanding Starch Functionality," *Food Product Design*, pp. 1–8, Jan. 1996 (www.foodproduct-design.com/archive/1996/0196CS.html).
National Starch and Chemical, Dictionary of Food Starch Terms ("retrogradation") 2002 (www.foodstarch.com/dictionary/r.asp).
Thomas et al., *Starches*, pp. 1–30 (1999).

* cited by examiner

*Primary Examiner*—Samuel Barts
*Assistant Examiner*—Michael C. Henry
(74) *Attorney, Agent, or Firm*—Marshall, Gerstein & Borun LLP

(57) ABSTRACT

A starch-based modeling compound includes a starch-based binder and about 2% to about 10% retrogradation inhibitor, such as waxy corn starch.

28 Claims, No Drawings

STARCH-BASED MODELING COMPOUND

FIELD OF THE INVENTION

The invention relates generally to flexible modeling compounds that can be used for molding, extruding, or sculpting shapes or figures. In particular the invention relates to starch-based modeling compounds.

BACKGROUND OF THE INVENTION

Starch-based modeling compounds are well know in the art, such as the compositions disclosed in McVicker et al., U.S. Pat. No. 3,167,440, the disclosure of which is incorporated herein by reference. Starch-based modeling compounds, which are typically used by young children, include a starch-based binder, such wheat flour, rye flour, rice flour, or tapioca flour. The starch-based binder is mixed with water, a salt, a lubricant, and a preservative, according to methods known to those skilled in the art.

Starch is the primary source of stored energy in cereal grains. Starches are composed primarily of amylose, a comparatively low molecular weight straight-chain carbohydrate, and/or amylopectin, a branched carbohydrate having a much higher molecular weight and, in solution, a higher viscosity. For example, wheat starch contains about 25% amylose and about 75% amylopectin; and tapioca starch contains about 17% amylose and about 83% amylopectin. (Percentages herein refer to percentage by weight, unless otherwise specified.) "Waxy" starches contain at least about 90% amylopectin. Waxy corn starch, for example, contains less than about 1% amylose and greater than about 99% amylopectin. Amylose and amylopectin do not exist free in nature, but as components of discrete, semicrystalline aggregates called starch granules. When an aqueous starch solution is heated, gelatinization occurs, during which the crystal structure of starch granules is disrupted, and the starch granules absorb water and hydrate, and the viscosity of the solution increases. See generally David J. Thomas & William Altwell, Starches (1999) at 25–30. Retrogradation is a process involving reassociation of starch molecules that occurs after a freshly-made starch gel is cooled. Id.

The processes of gelatinization and retrogradation affect the characteristics of starch-containing products, such as starch-based modeling compounds. During manufacturing of starch-based modeling compounds, gelatinization occurs, forming modeling compounds that are soft, and easy to manipulate and shape, due to their soft texture and low viscosity. However, retrogradation begins to occur shortly after manufacturing, and is usually well advanced in as little as 48 hours. Retrogradation causes significant hardening of starch-based modeling compounds and increases viscosity. The hardening and increasing of viscosity of the modeling compounds is undesirable because the hardened compounds are more difficult to manipulate and shape, particularly by young children.

Amylopectin starch is known to be resistant to retrogradation. However, when amylopectin is mixed with water and heated, it tends to form a paste having a sticky texture, rather than a soft gel, which is desired for a modeling compound. A sticky texture in a modeling compound causes the modeling compound to be messy for the user to manipulate, as the compound is more likely to stick to hands, molds, toys, furniture, and carpeting. There is a need for a starch-based modeling compound that has a soft, flexible texture, low viscosity, is not sticky, and resists retrogradation and hardening over time.

SUMMARY OF THE INVENTION

According to one aspect of the invention, a starch-based modeling compound includes about 2% to about 10% retrogradation inhibitor. The retrogradation inhibitor can include amylopectin. The retrogradation inhibitor can include a waxy starch, such as waxy corn starch, waxy rice starch, or waxy potato starch.

According to another aspect of the invention, a starch-based modeling compound includes about 20% to about 50% water; about 5% to about 15% salt; about 2.0% to about 4.5% lubricant; about 0.2% to about 1.0% surfactant; about 30% to about 42% starch-based binder; about 0.1% to about 1% preservative; 0% to about 1% hardener; about 2% to about 10% retrogradation inhibitor; 0% to about 25% humectant; 0% to about 0.5% fragrance; and 0% to about 3.5% colorant. The salt can be selected from sodium chloride, calcium chloride, and potassium chloride. The lubricant can be selected from mineral spirits, mineral oil, and vegetable oil. The surfactant can be selected from polyethylene glycol esters of stearic acid, polyethylene glycol esters of lauric acid, ethoxylated alcohols, polyoxyethylenesorbitan monostearate (e.g., Tween® 60, ICI Americas, Inc., Wilmington, Del.), and polyoxyethylenesorbitan monolaurate (e.g., Tween® 20, ICI Americas, Inc., Wilmington, Del.). The surfactant is preferably hydrophilic, and can have an HLB (hydrophile lipophile balance) value of about 12 to about 15. The starch-based binder can be selected from wheat flour, rye flour, rice flour, tapioca flour, and combinations thereof. The preservative can be selected from calcium propionate, sodium benzoate, methyl paraben, ethyl paraben, butyl paraben, and borax. The hardener can be selected from sodium aluminum sulfate, potassium aluminum sulfate, aluminum ammonium sulfate, aluminum sulfate, and ammonium ferric sulfate. The retrogradation inhibitor can include amylopectin. The retrogradation inhibitor can be selected from waxy corn starch, waxy rice starch, and waxy potato starch. The modeling compound can also include an acidulant. The acidulant can be selected from citric acid, alum, and potassium dihydrogen sulfate. The modeling compound can have a pH of about 3.5 to about 4.5. The modeling compound can have a pH of about 3.8 to about 4.0. The humectant can be a glycol. The glycol can be glycerin or a low molecular weight polyethylene glycol.

According to still another aspect of the present invention, a method of preparing a starch-based modeling compound includes the steps of:

(a) providing a mixer;
  (b) adding the following ingredients to the mixer:
    (1) about 5% to about 15% salt;
    (2) about 2.0% to about 4.5% lubricant;
    (3) about 0.2% to about 1.0% surfactant;
    (4) about 30% to about 42% starch-based binder;
    (5) about 0.1% to about 1% preservative;
    (6) about 2% to about 10% retrogradation inhibitor; and
    (7) about 20% to about 50% water; and
  (c) mixing the ingredients for at least about 5 minutes.

The ingredients can also include: 0% to about 1% hardener; 0% to about 25% humectant; 0% to about 0.5% fragrance; and 0% to about 3.5% colorant. The salt, lubricant, surfactant, starch-based binder, preservative, and retrogradation inhibitor can be mixed to form a first mixture prior to adding the water to the first mixture; and the water can be heated to a temperature of at least about 150° F. (about 66° C.) prior to adding the water to the first mixture. The water can be heated to a temperature of at least about 170° F. (about 77° C.) prior to adding the water to the first mixture.

The features and advantages of the present invention will be apparent to those of ordinary skill in the art in view of the detailed description of the preferred embodiment, provided below.

DETAILED DESCRIPTION OF PREFERRED EMBODIMENTS

According to one aspect of the present invention, a starch-based modeling compound includes about 2% to about 10% retrogradation inhibitor. The retrogradation inhibitor can include amylopectin. The retrogradation inhibitor can include a waxy starch, such as waxy corn starch, waxy rice starch, or waxy potato starch.

According to another aspect of the present invention, a starch-based modeling compound includes about 20% to about 50% water; about 5% to about 15% salt; about 2.0% to about 4.5% lubricant; about 0.2% to about 1.0% surfactant; about 30% to about 42% starch-based binder; about 0.1% to about 1% preservative; 0% to about 1% hardener; about 2% to about 10% retrogradation inhibitor; 0% to about 25% humectant; 0% to about 0.5% fragrance; and 0% to about 3.5% colorant.

The water preferably meets the National Primary Drinking Water Specifications (see 40 C.F.R. ch. 1, part 141) or the requirements of ASTM F-963, Standard Consumer Safety Specification on Toy Safety, Section 4.3.6.1. The salt can be selected from, for example, sodium chloride, calcium chloride, and potassium chloride. The salt reduces the water of hydration for starch, and also provides the modeling compound with antimicrobial characteristics. The lubricant can be selected from, for example, mineral spirits, mineral oil, and vegetable oil. The surfactant can be selected from, for example, polyethylene glycol esters of stearic acid, polyethylene glycol esters of lauric acid, ethoxylated alcohols, polyoxyethylenesorbitan monostearate, and polyoxyethylenesorbitan monolaurate. The surfactant is preferably hydrophilic, and can have an HLB value of about 12 to about 15. The combination of lubricant and surfactant reduces the stickiness of the starch-based modeling compound. Preferably, the lubricant has a low enough viscosity so that the modeling compound does not feel slimy to the touch.

The starch-based binder can be selected from, for example, wheat flour, rye flour, rice flour, tapioca flour, and combinations thereof. The preservative can be selected from calcium propionate, sodium benzoate, methyl paraben, ethyl paraben, butyl paraben, and borax. The preservative can also be any other appropriate preservative known to those skilled in the art, such as one or more preservative compounds that inhibit mold growth at a pH of less than about 4.5, used alone or in combination. The hardener can be selected from, for example, sodium aluminum sulfate, potassium aluminum sulfate, aluminum ammonium sulfate, aluminum sulfate, and ammonium ferric sulfate.

The retrogradation inhibitor can include amylopectin. The retrogradation inhibitor can include a waxy starch. The retrogradation inhibitor can be selected from waxy corn starch, waxy rice starch, and waxy potato starch. The modeling compound can also include an acidulant. The acidulant can be selected from citric acid, alum, and potassium dihydrogen sulfate. Alternatively, any known nontoxic acid can be used. The modeling compound can have a pH of about 3.5 to about 4.5. The modeling compound can have a pH of about 3.8 to about 4.0. The humectant can be a glycol. The glycol can be glycerin or a low molecular weight polyethylene glycol. The fragrance can be, for example, any water-dispersible, nontoxic fragrance. The colorant can include, for example, any nontoxic dyes, pigments, phosphorescent pigments, or macro-sized particles such as glitter or pearlescent materials.

One embodiment includes about 3% to about 10% sodium chloride; about 3% to about 10% calcium chloride; about 0.5% to about 1.1% aluminum sulfate; about 0.35% to about 0.80% 10 mol borax (i.e., borax decahydrate); about 0.1% to about 0.5% sodium benzoate; about 30% to about 38% wheat flour; about 3.5% to about 7.0% waxy corn starch; about 0.4% to about 1.0% PEG 1500 monostearate; about 2.5% to about 4.0% mineral oil; about 0.05% to about 0.25% vanilla fragrance; and the remainder water (about 45%); wherein the amounts of aluminum sulfate and borax are adjusted so that the composition has a pH of about 3.5 to about 4.5. The composition can be pigmented to nearly any desired color. For example, to obtain a blue fluorescent color, the composition can include about 0.2 to about 1 part by weight Day-Glo® Horizon Blue (Day-Glo Color Corp., Cleveland, Ohio) to about 100 parts of the composition. To obtain a red color (lake pigment), add about 0.1 to about 0.5 parts by weight FD&C Red No. 40 dye aluminum lake to about 100 parts of the composition.

According to still another aspect of the present invention, a method of preparing a starch-based modeling compound includes the steps of:

(a) providing a mixer; and
(b) adding the following ingredients to the mixer:
  (1) about 5% to about 15% salt;
  (2) about 2.0% to about 4.5% lubricant;
  (3) about 0.2% to about 1.0% surfactant;
  (4) about 30% to about 42% starch-based binder;
  (5) about 0.1% to about 1% preservative; and
  (6) about 2% to about 10% retrogradation inhibitor; and
  (7) about 20% to about 50% water; and
(c) mixing the ingredients for at least about 5 minutes.

The ingredients can also include: 0% to about 1% hardener; 0% to about 25% humectant; 0% to about 0.5% fragrance; and 0% to about 3.5% colorant. The salt, lubricant, surfactant, starch-based binder, preservative, and retrogradation inhibitor can be mixed to form a first mixture prior to adding the water to the first mixture; and the water can be heated to a temperature of at least about 150° F. (about 66° C.) prior to adding the water to the first mixture. The water can be heated to a temperature of at least about 170° F. (about 77° C.) prior to adding the water to the first mixture. Any suitable mixer known to those skilled in the art can be used, such as an ordinary bakery dough mixer, e.g. an FKM series batch mixer (Littleford Day Inc., Florence, Ky.).

According to the invention, a starch-based modeling compound is produced that is surprisingly resistant to retrogradation and has a soft, flexible texture that is low in viscosity and stickiness. For example, approximately 48 hours after preparing a starch-based modeling compound, a compound according to the invention can have a viscosity of, e.g., about 18,000 Pascal seconds, in comparison to a starch-based modeling compound not including a retrogradation preventer, which can have a viscosity, for example, of about 32,000 Pascal seconds. Unexpectedly, combining a waxy starch, such as waxy corn starch, with a starch-based binder, such as wheat flour, produces a composition that is resistant to retrogradation, yet does not have a sticky, pasty texture that is typically obtained when waxy starches are mixed with water and heated. The inventive modeling compound has a soft, flexible texture, low viscosity and stickiness, and resistance to retrogradation, which make the compound easier to use for molding, extruding, or sculpting shapes or figures, particularly by young children who typically use starch-based modeling compounds.

The following examples demonstrate illustrative embodiments of the invention:

EXAMPLES

Example 1

| INGREDIENTS | PERCENT |
|---|---|
| Sodium Chloride | 5.79 |
| Calcium Chloride | 5.79 |
| Aluminum Sulfate | 0.71 |
| 10 Mol Borax | 0.51 |
| Sodium Benzoate | 0.20 |
| Wheat Flour | 32.99 |
| Waxy Maize Starch, C-Gel 04230 (Cerestar; Paris, France) | 4.82 |
| PEG 1500 Monostearate | 0.51 |
| Mineral Oil | 2.92 |
| Water | 45.67 |
| Vanilla Fragrance | 0.10 |

Example 2

| INGREDIENTS | PERCENT |
|---|---|
| Sodium Chloride | 6.16 |
| Calcium Chloride | 6.16 |
| Aluminum Sulfate | 0.27 |
| Potassium Dihydrogen Phosphate | 0.15 |
| Sodium Benzoate | 0.22 |
| Wheat Flour | 32.34 |
| Waxy Maize Starch C-Gel 04230 (Cerestar; Paris, France) | 5.88 |
| PEG 1500 Monostearate | 0.54 |
| Mineral Oil | 3.10 |
| Water | 45.08 |
| Vanilla Fragrance | 0.11 |

Example 3

| INGREDIENTS | PERCENT |
|---|---|
| Sodium Chloride | 5.63 |
| Calcium Chloride | 5.63 |
| Aluminum Sulfate | 0.69 |
| 10 MOL Borax | 0.44 |
| Sodium Benzoate | 0.20 |
| Wheat Flour | 33.34 |
| Waxy Rice Starch, Remyline Dr (N.V. Remy Industries; Brussels, Belgium) | 6.17 |
| PEG 1500 Monostearate | 0.49 |
| Mineral Oil | 2.84 |
| Water | 44.46 |
| Vanilla Fragrance | 0.10 |

Example 4

| INGREDIENTS | PERCENT |
|---|---|
| Sodium Chloride | 5.79 |
| Calcium Chloride | 5.79 |
| Aluminum Sulfate | 0.71 |
| 10 MOL Borax | 0.51 |
| Sodium Benzoate | 0.20 |
| Flour | 32.99 |
| Waxy Maize C-Gel 04230 (Cerestar; Paris, France) | 4.82 |
| Surfactant* | 0.51 |
| Mineral Oil | 2.92 |
| Water | 45.67 |
| Vanilla Fragrance | 0.10 |

*Surfactant can be Tween ® 60, PEG 400 monolaurate, PEG 1750 monostearate, PEG 600 monolaurate, PEG 150 distearate, or combinations thereof.

Example 5

Any of the compositions described in Examples 1–4 can be prepared according to the following procedure:

1. All of the dry ingredients (e.g., the salt, starch-based binder, preservative, hardener, and retrogradation inhibitor) are added to a mixer, such as an FKM series batch mixer.
2. The mixer is turned on and set on a speed of 30 rpm.
3. After 2 minutes, mineral oil is added to the mixture.
4. After 30 seconds, PEG 1500 monostearate (or other surfactant(s)) and fragrance are added to the mixture.
5. Add water, preheated to a temperature of about 170° F. (about 77° C.), to the mixture.
6. Mix for an additional 5 minutes.
7. Discharge the fully compounded modeling compound from the mixer.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A starch-based modeling compound comprising about 2% to about 10% retrogradation inhibitor.

2. The starch-based modeling compound of claim 1, wherein the retrogradation inhibitor comprises amylopectin.

3. The starch-based modeling compound of claim 1, wherein the retrogradation inhibitor comprises a waxy starch.

4. The starch-based modeling compound of claim 1, wherein the retrogradation inhibitor is selected from the group consisting of waxy corn starch, waxy rice starch, waxy potato starch, and combinations thereof.

5. A starch-based modeling compound comprising:
    (a) about 20% to about 50% water;
    (b) about 5% to about 15% salt;
    (c) about 2.0% to about 4.5% lubricant;
    (d) about 0.2% to about 1.0% surfactant;
    (e) about 30% to about 42% starch-based binder;
    (f) about 0.1% to about 1% preservative;
    (g) 0% to about 1% hardener;

(h) about 2% to about 10% retrogradation inhibitor;

(i) 0% to about 25% humectant;

(j) 0% to about 0.5% fragrance; and (k) 0% to about 3.5% colorant.

6. The modeling compound of claim 5 wherein the salt is selected from the group consisting of sodium chloride, calcium chloride, and potassium chloride.

7. The modeling compound of claim 5 wherein the lubricant is selected from the group consisting of mineral spirits, mineral oil, and vegetable oil.

8. The modeling compound of claim 7 wherein the lubricant is mineral oil.

9. The modeling compound of claim 5 wherein the surfactant is selected from the group consisting of polyethylene glycol esters of stearic acid, polyethylene glycol esters of lauric acid, ethoxylated alcohols, polyoxyethylenesorbitan monostearate, and polyoxyethylenesorbitan monolaurate.

10. The modeling compound of claim 5 wherein the surfactant has an HLB value of about 12 to about 15.

11. The modeling compound of claim 5 wherein the surfactant is hydrophilic.

12. The modeling compound of claim 5 wherein the starch-based binder is selected from the group consisting of wheat flour, rye flour, rice flour, tapioca flour, and combinations thereof.

13. The modeling compound of claim 5 wherein the preservative is selected from the group consisting of calcium propionate, sodium benzoate, methyl paraben, ethyl paraben, butyl paraben, and borax.

14. The modeling compound of claim 5 wherein the hardener is selected from the group consisting of sodium aluminum sulfate, potassium aluminum sulfate, aluminum ammonium sulfate, aluminum sulfate, and ammonium ferric sulfate.

15. The modeling compound of claim 5 wherein the retrogradation inhibitor comprises amylopectin.

16. The modeling compound of claim 5 wherein the retrogradation inhibitor comprises a waxy starch.

17. The modeling compound of claim 5 wherein the retrogradation inhibitor is selected from the group consisting of waxy corn starch, waxy rice starch, waxy potato starch, and combinations thereof.

18. The modeling compound of claim 17 wherein the retrogradation inhibitor is waxy corn starch.

19. The modeling compound of claim 5 further comprising an acidulant.

20. The modeling compound of claim 19 wherein the acidulant is selected from the group consisting of citric acid, alum, and potassium dihydrogen sulfate.

21. The modeling compound of claim 5 having a pH of about 3.5 to about 4.5.

22. The modeling compound of claim 21 having a pH of about 3.8 to about 4.0.

23. The modeling compound of claim 5 wherein the humectant is a glycol.

24. The modeling compound of claim 23 wherein the glycol is glycerin or a low molecular weight polyethylene glycol.

25. A method of preparing a starch-based modeling compound comprising the following steps:

(a) providing a mixer;

(b) adding the following ingredients to the mixer:

(1) about 5% to about 15% salt;

(2) about 2.0% to about 4.5% lubricant;

(3) about 0.2% to about 1.0% surfactant;

(4) about 30% to about 42% starch-based binder;

(5) about 0.1% to about 1% preservative;

(6) about 2% to about 10% retrogradation inhibitor; and (7) about 20% to about 50% water; and (c) mixing the ingredients for at least about 5 minutes.

26. The method of claim 25 wherein the ingredients further comprise:

(8) 0% to about 1% hardener;

(9) 0% to about 25% humectant;

(10) 0% to about 0.5% fragrance; and

(11) 0% to about 3.5% colorant.

27. The method of claim 25 wherein the salt, lubricant, surfactant, starch-based binder, preservative, and retrogradation inhibitor are mixed to form a first mixture prior to adding the water to the first mixture; and the water is heated to a temperature of at least about 150° F. (about 66° C.) prior to adding the water to the first mixture.

28. The method of claim 27 wherein the water is heated least about 170° F. (about 77° C.) prior to adding the water to the first mixture.

\* \* \* \* \*

UNITED STATES PATENT AND TRADEMARK OFFICE
CERTIFICATE OF CORRECTION

| | | |
|---|---|---|
| PATENT NO. | : 6,713,624 B1 | Page 1 of 1 |
| APPLICATION NO. | : 10/137579 | |
| DATED | : March 30, 2004 | |
| INVENTOR(S) | : Linwood E. Doane, Jr. et al. | |

It is certified that error appears in the above-identified patent and that said Letters Patent is hereby corrected as shown below:

Claim 28,
Column 8, lines 41-42      Please delete "the water is heated least about" and replace with --the water is heated to a temperature of at least about--.

Signed and Sealed this

Twenty-ninth Day of January, 2008

JON W. DUDAS
*Director of the United States Patent and Trademark Office*